United States Patent [19]

Yamada et al.

[11] Patent Number: 4,953,009

[45] Date of Patent: Aug. 28, 1990

[54] SIGNAL SEPARATOR HAVING FUNCTION OF SUBSAMPLING DIGITAL COMPOSITE VIDEO SIGNAL

[75] Inventors: Masahiro Yamada, Kawasaki; Seijiro Yasuki; Kiyoshi Hoshino, both of Yokohama, all of Japan

[73] Assignee: Kabushiki Kaisha Toshiba, Kawasaki, Japan

[21] Appl. No.: 288,870

[22] Filed: Dec. 23, 1988

[30] Foreign Application Priority Data

Dec. 28, 1987 [JP] Japan .................. 62-330076

[51] Int. Cl.$^5$ .............................. H04N 9/78
[52] U.S. Cl. .................................. 358/31
[58] Field of Search .................... 358/31, 40

[56] References Cited

U.S. PATENT DOCUMENTS

| | | | |
|---|---|---|---|
| 4,218,700 | 8/1980 | Kashigi | 358/31 |
| 4,456,922 | 6/1984 | Balaban | 358/31 |
| 4,470,069 | 9/1984 | Lewis, Jr. | 358/31 |
| 4,644,389 | 2/1987 | Nakagawa | 358/31 |
| 4,843,457 | 6/1989 | Yamagata | 358/31 |

FOREIGN PATENT DOCUMENTS 2154093 8/1985 United Kingdom .

OTHER PUBLICATIONS

Translation, Jun. 14, 1989, 2,338,777 German Patent Office, pp. 1-4.
SMPTE Journal, "A Motion-Adaptive High-Definition Converter for NTSC Color TV Signals"; Masahiko Achiha et al; May 1984.

Primary Examiner—Tommy P. Chin
Attorney, Agent, or Firm—Cushman, Darby & Cushman

[57] ABSTRACT

A signal separator includes an A/D converter which samples a composite color television signal including a luminance signal component and a color difference signal component at a sampling frequency four times a frequency of a chrominance subcarrier and outputs a digital signal. A timing signal generator receives the digital signal and generates at least first and second timing signals. A subsampling circuit subsamples the digital signal in accordance with the first timing signal and outputs a subsampled signal. A frame delaying circuit delays the subsampled signal by one frame and outputs a delayed signal. The signal separator further includes first interpolation circuit which interpolates the delayed signal in accordance with the second timing signal and outputs a first interpolated signal. A first separator separates the color difference signal component from the composite color television signal by mixing the first interpolated signal and the digital signal. A second interpolation circuit interpolates the color difference signal component by a predetermined signal and outputs a second interpolated signal. A second separator separates the luminance signal component by mixing the first interpolated signal and the second interpolated signal.

9 Claims, 7 Drawing Sheets

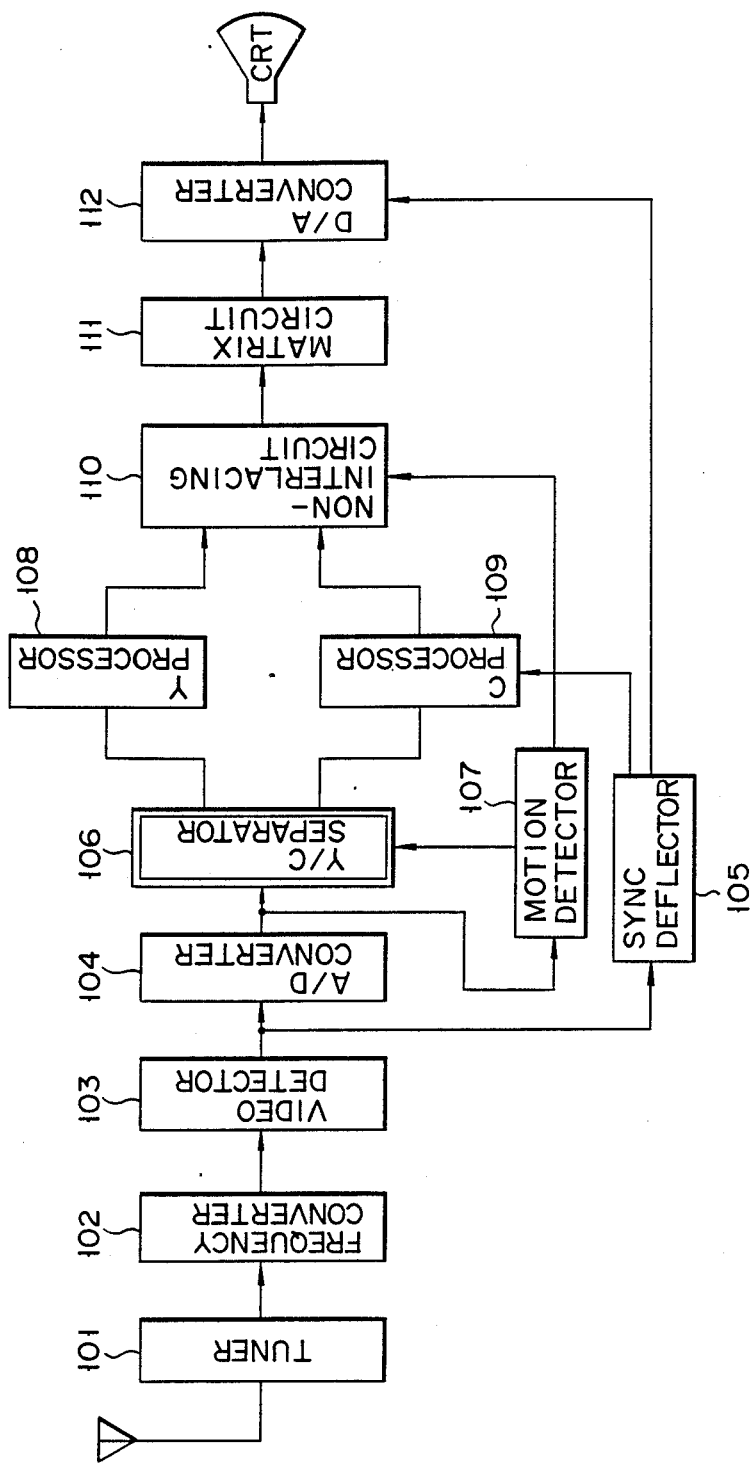
F I G. 1

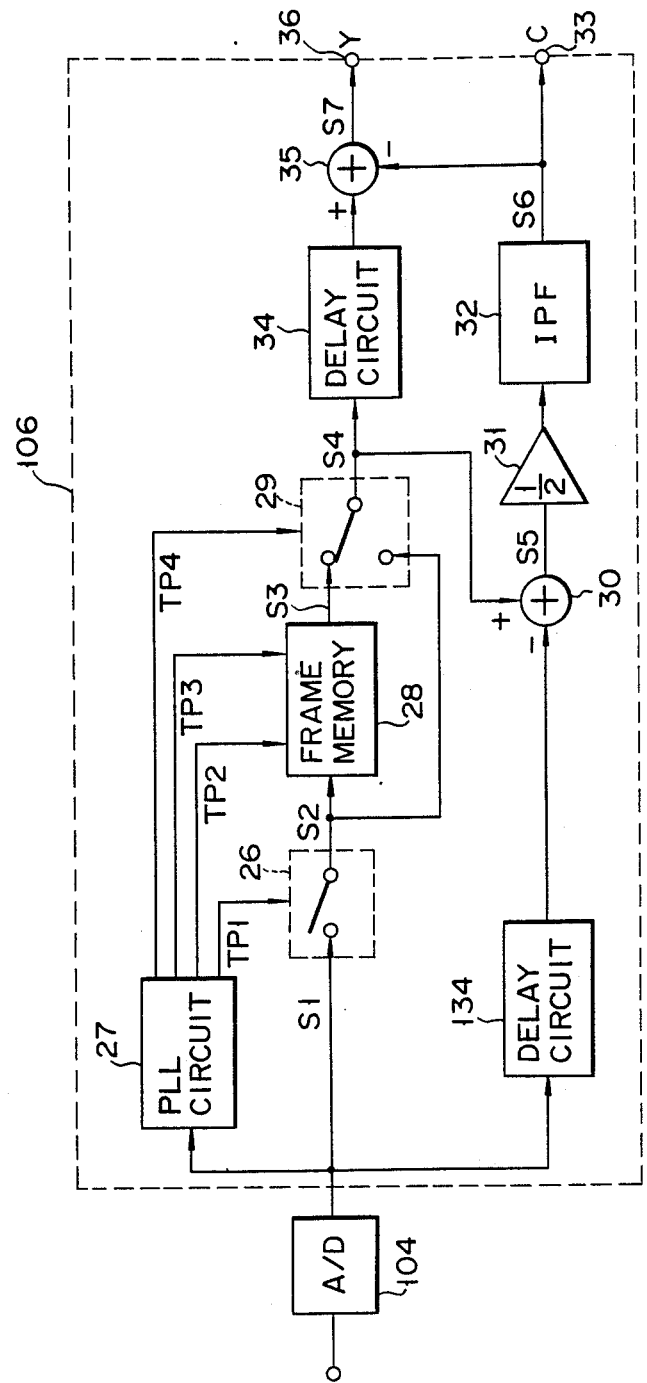
F I G. 4

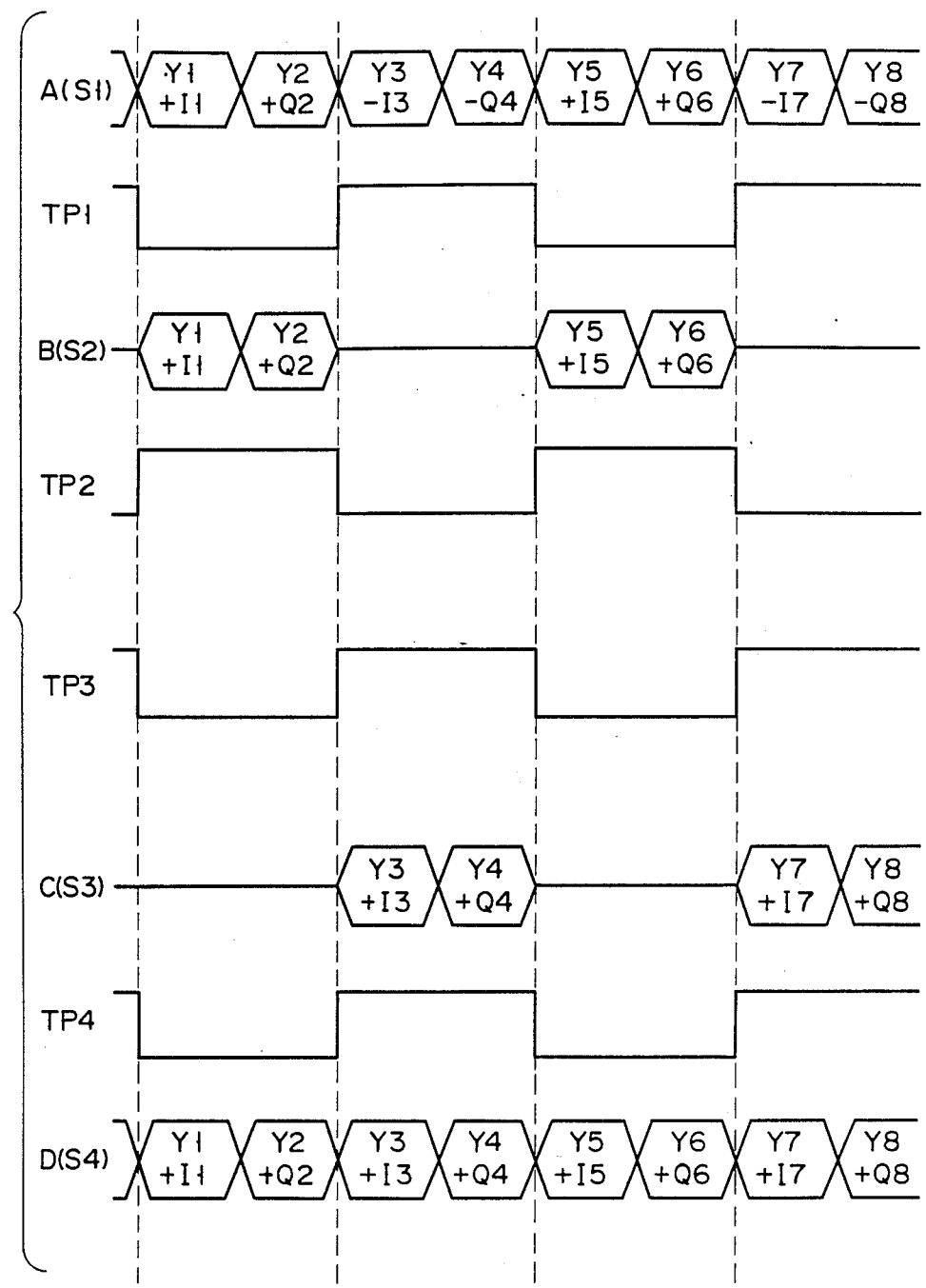
F I G. 7

SIGNAL SEPARATOR HAVING FUNCTION OF SUBSAMPLING DIGITAL COMPOSITE VIDEO SIGNAL

BACKGROUND OF THE INVENTION

1. Field of the Invention

The present invention relates to a signal separator and, more particularly, to a Y/C separator having a function of subsampling a digital composite video signal.

2. Description of the Related Art

In the existing color television broadcast system, a composite video signal obtained by superposing a color difference signal (to be referred to as a C signal hereinafter) which is balance-modulated by a chrominance subcarrier on a luminance signal (to be referred to as a Y signal hereinafter) is used as a television signal to be transmitted. For this reason, a reception side requires a luminance/chrominance (to be referred to as Y/C hereinafter) separator in order to reproduce the Y signal and C signal. A low-pass filter or band-pass filter is used as a conventional Y/C separator. However, the low-pass filter or band-pass filter cannot perform perfect Y/C separation, and cross color or dot interference occurs, thus degrading image quality. A comb filter was developed later to improve Y/C separation performance. However, when the comb filter is used, the Y/C separation performance is improved but resolution in a diagonal direction of the screen is degraded.

In order to solve this problem, in particular, in order to achieve high image quality, a so-called motion adaptive Y/C separator used in a digital video system which has a digital circuit corresponding to a video detector and the subsequent circuit has been developed. The motion adaptive Y/C separator changes a parameter in accordance with a pattern to perform Y/C separation corresponding to motion of an image, and is described in an article entitled "A Motion Adaptive High-Definition Converter for NTSC Color TV Signals", SMPTE journal, May 1984. In this article, since a calculation is not performed in the horizontal and vertical directions of an image as long as the image is a still image, efficient Y/C separation free from degradation of an image can be achieved.

However, the conventional adaptive Y/C separator requires delaying a composite video signal by one frame period. Therefore, a circuit scale must be increased accordingly.

For this reason, a demand has arisen for a Y/C separator which keeps a performance equivalent to the conventional Y/C separation performance, and can reduce a memory capacity as much as possible.

SUMMARY OF THE INVENTION

It is therefore an object of the present invention to provide a signal separator which keeps a conventional signal separation performance and can reduce a memory capacity required for delaying a composite video signal by one frame period.

According to the invention, there is provided a signal separator comprising:

A/D converter means for receiving a composite color video signal including first and second signal components and outputting a digital signal;

timing signal generating means for receiving the digital signal output from the A/D converter means and generating at least first and second timing signals;

data band compression means for compressing a data band of the digital signal output from the A/D converter means in accordance with the first timing signal generated by the timing signal generating means and outputting a compressed signal;

delay memory means for delaying the compressed signal output from the data band compression means by one frame and outputting a delayed signal;

first interpolation means for interpolating the delayed signal output from the delay memory means by the compressed signal output from the data band compression means in accordance with the second timing signal generated by the timing signal generating means, and outputting a first interpolated signal;

first separation means for separating the first signal component from the composite color video signal by mixing the first interpolated signal output from the first interpolation means and the digital signal output from the A/D converter means;

second interpolation means for interpolating the first signal component separated by the first separation means by a predetermined signal and outputting a second interpolated signal; and second separation means for separating the second signal component by mixing the first interpolated signal output from the first interpolation means and the second interpolated signal output from the second interpolation means.

BRIEF DESCRIPTION OF THE DRAWINGS

The foregoing aspects and other features of the invention will be explained in the following description in connection with the accompanying drawings wherein:

FIG. 1 is a block diagram schematically showing a digital color receiver to which the present invention is applied;

FIG. 4 is a circuit diagram showing an embodiment of a signal separator according to the present invention;

FIG. 7 is a timing chart showing timings of the signals generated at the respective portions of the circuit shown in FIG. 4;

DETAILED DESCRIPTION OF THE PREFERRED EMBODIMENT

Figure 2:
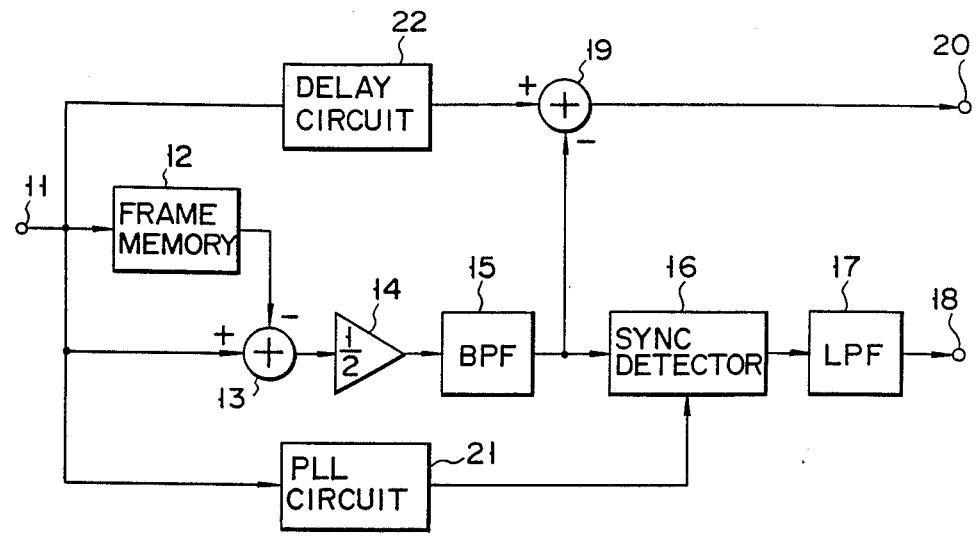
FIG. 2 is a circuit diagram showing a conventional signal separator.

A digital color television receiver to which an embodiment of the present invention is applied will be briefly described hereinafter with reference to FIG. 1.

As shown in FIG. 1, of NTSC composite television signals applied to an antenna terminal of the receiver, a signal of a channel to be received is selected and amplified by tuner 101. The composite television signal from tuner 101 is converted to an intermediate frequency (IF) signal by frequency converter 102. The IF signal is amplified by a video intermediate frequency amplifier (not shown). The amplified IF signal is detected by video detector 103, and a color television signal is extracted. The color television signal is supplied to A/D converter 104, and is also supplied to sync deflector 105. A/D converter 104 samples the color television signal in response to a clock signal having a frequency 4fsc (fsc: subcarrier frequency) synchronous with a burst signal, and converts the color television signal into an 8-bit, 14.3-MHz composite digital television signal. The digital television signal is supplied to Y/C separator 106 of the present invention. Y/C separator 106 separates the composite digital television signal into a Y (luminance signal) component and a C (chrominance signal) component. The Y signal is mainly subjected to horizontal/vertical edge emphasis processing and Y nonlinear processing in Y processor 108. On the other hand, the C signal is mainly subjected to band-pass filter processing, matrix color demodulation processing, ACC (Automatic Color Control) processing, and color killer processing in C processor 109. The Y-processed Y signal and the C-processed C signal are supplied to non-interlacing circuit 110.

The digital television signal from A/D converter 104 is also supplied to motion detector 107. Motion detector 107 detects a motion signal corresponding to motion of an image from the digital television signal, and supplies the control signal to Y/C separator 106 to perform adaptive Y/C separation and to non-interlacing circuit 110 to perform scanning line interpolation. Non-interlacing circuit 110 comprises an interpolation signal generator for scanning line interpolation and a time base converter. The time base converter writes the Y and C signals as input present signals and an interpolating signal in a line memory, and alternately reads out the present signals and the interpolating signal at a speed twice a write address access, thus compressing the time base. Thus, a horizontal scanning frequency is doubled (31.468 kHz), and is input to matrix circuit 111. Matrix circuit 111 converts the Y and C signals to R, G, and B, i.e., three primary signals. The R, G, and B signals are converted to analog signals by a D/A converter 112, and are then supplied to a CRT, thus driving the CRT.

As described above, the color television signal is supplied to A/D converter 104, and is also supplied to sync deflector 105. Sync deflector 105 mainly comprises a sync circuit and a deflector. The sync circuit removes a video signal from the color television signal, and extracts only a sync signal. The deflector flows a deflection current controlled by the sync signal from the sync circuit to a deflection coil of the CRT. The sync signal is also supplied to C processor 109, so that color demodulation in C processor 109 is controlled to be synchronized with the phase of 4fsc. For this purpose, sync deflector 105 comprises a phase locked loop (PLL) for generating a color sync signal or burst gate signal.

FIG. 2 shows a circuit arrangement of a portion of a conventional motion adaptive Y/C separator corresponding to a still image. This portion performs Y/C separation by a calculation among frames.

In FIG. 2, the composite television signal supplied to input terminal 11 is delayed by one frame by frame memory 12, and is then supplied to adder 13. Adder 13 subtracts the composite television signal delayed by one frame by frame memory 12 from the composite television signal supplied to input terminal 11, thus extracting a C (chrominance) signal. The C signal is supplied to coefficient circuit 14, and its amplitude is attenuated to $\frac{1}{2}$, i.e., to its original amplitude. An unnecessary component is removed from the output from coefficient circuit 14 by band-pass filter (to be abbreviated as DPF hereinafter) 15. The output from BPF 15 is sync-detected by sync detector 16. An unnecessary component is removed from the detection output by low-pass filter (to be abbreviated as LPF hereinafter) 17. The output from LPF 17 is then supplied to output terminal 18 as a C signal separation output.

The output from BPF 15 is also supplied to adder 19, and is subtracted from the composite television signal supplied to input terminal 11 and delayed in delay circuit 22. Thus, a Y signal can be obtained from adder 19. The Y signal is supplied to output terminal 20 as a Y signal separation output.

Note that reference numeral 21 denotes a phase locked loop circuit (to be referred to as a PLL circuit hereinafter) for outputting a carrier signal for sync-detection in sync detector 16 in synchronism with a color burst signal included in the composite television signal.

The operation of the circuit will now be described in detail with reference to FIG. 3.

Figure 3:
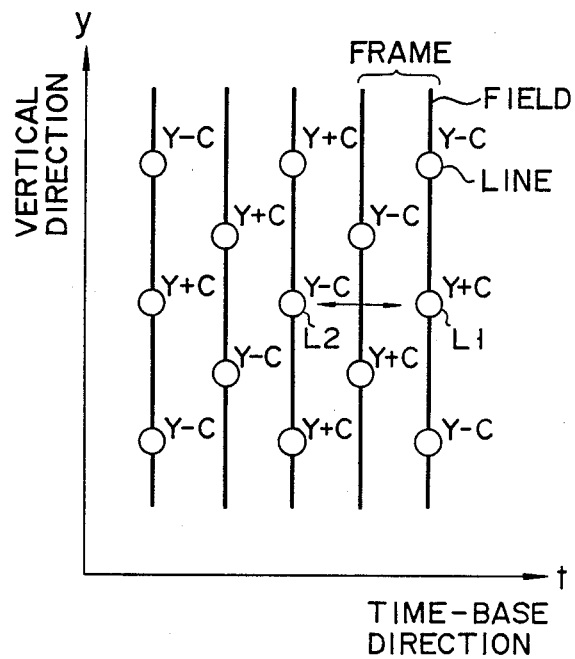
FIG. 3 is a view for explaining an operation of the circuit shown in FIG. 2.

FIG. 3 is a view when a transmitted NTSC composite television signal is viewed in the time-base direction (t axis) and the vertical direction (y axis). In FIG. 3, vertical lines represent fields, and circles on these lines represent scanning lines.

In the NTSC composite television signal, the phase of the C signal is inverted between lines and between frames. Therefore, when a composite television signal on presently transmitted scanning line L1 is a signal including a positive C signal (Y+C), a composite television signal on scanning line L2 transmitted one frame before is a signal including a negative C signal (Y−C). In a completely still image, a C signal can be obtained by subtracting the composite television signal on scanning line L2 of the immediately preceding frame from the composite television signal on present scanning line L1 and multiplying $\frac{1}{2}$ with an amplitude of the difference output, as shown in the following equation:

$$\tfrac{1}{2}\{Y+C-(Y-C)\}=C$$

In the above-mentioned signal processing, frame memory 12, adder 13, and coefficient circuit 14 are used.

BPF 15 removes, from the output from the adder 13, a frequency component in a band on which no C signal is superposed. Therefore, the output from BPF 15 is subtracted from the composite television signal supplied to input terminal 11 and delayed in delay circuit 22, thus obtaining a Y signal, as shown in the following equation:

$$(Y+C)-C=Y$$

The still image Y/C separator described above performs Y/C separation by an interframe calculation. Thus, perfect Y/C separation can be performed without losing horizontal and vertical components of an image. However, since large-capacity frame memory 12 is required, the circuit scale is undesirably increased. For example, assume that an NTSC composite television signal is sampled at 4fsc, and the sampled signal is quantized to 8 bits. In this case, the capacity of frame memory 12 becomes very large, i.e., is given by:

$$525 \times 910 \times 8 = 4 \text{ Mbits}$$

The present invention that has been made to solve the above problem will be described below.

FIG. 4 is circuit diagram of an embodiment of the present invention.

The NTSC composite digital television signal (to be referred to simply as a composite television signal hereinafter) sampled at a frequency of 4fsc by A/D converter 104 is supplied to Y/C separator 106 according to the present invention. The composite television signal consists of luminance signal Y, and color difference signals I and Q, and if a sampling pulse is synchronous with I and Q axes, it becomes a signal like Y+I, Y+Q, Y−I, Y−Q, Y+I, Y+Q,....

The composite television signal is supplied to switch circuit 26, PLL circuit 27, and delay circuit 134. The composite television signal supplied to switch circuit 26 is subsampled in accordance with a repetitive period of its chrominance subcarrier. Thus, subsampling outputs Y+I, Y+Q, blank, blank, Y+I, Y+Q,.. can be obtained from switch circuit 26. Note that as the sampling pulse for subsampling, timing pulse TP1 output from PLL circuit 27 is used. PLL circuit 27 is synchronous with a color burst signal included in the composite television signal, and outputs timing pulses TP1 to TP4 having the same period as that of the repetitive period and a duty ratio of 1:1 to switch circuit 26, frame memory 28, and switch circuit 29, respectively. Switch circuit 26 is turned on when timing pulse TPI is at LOW level, and supplies the composite television signal to frame memory 28.

Frame memory 28 writes the subsampled composite television signal only when timing pulse TP2 is at HIGH level, and stores it for a one-frame period. After the lapse of the one-frame period, when timing pulse TP3 is at HIGH level, data in frame memory 28 is supplied to one input terminal of switch circuit 29. The other input terminal of switch circuit 29 receives the subsampling output from switch circuit 26 without going through frame memory 28. When timing pulse TP4 is at a LOW level, switch circuit 29 selects the subsampling output from switch circuit 26, and when it is at HIGH level, selects the output read out from frame memory 28.

generation timings of signals S1 to S4 will be described below with reference to a timing chart shown in FIG. 7.

As described above, PLL circuit 27 shown in FIG. 4 generates timing pulses TPI to TP4 at predetermined timings. When timing pulse TP1 is at LOW level, switch circuit 2 outputs only the positive composite television signal component, and when it is at HIGH level, does not output a signal. Thus, switch circuit 26 outputs signal S2. When timing pulse TP2 is at HIGH level, frame memory 28 writes the subsampled signal as data and increments a write address counter (not shown), and when timing pulse TP3 is at HIGH level, reads out the data and increments the write address counter. Therefore, signal S3 is output from frame memory 28. When timing pulse TP4 is at a LOW level, switch circuit 29 selects the subsampled output signal from switch circuit 26, and when it is at HIGH level, selects the output read out from frame memory 28.

Thus, signal S4 appears as the output from switch circuit 29.

The output selected by switch circuit 29 is supplied to adder 30 to perform an interframe calculation. Adder 30 subtracts the composite television signal supplied through delay circuit 134 from the output selected by switch circuit 29, thus extracting a C signal.

The amplitude of the C signal output from adder 30 by the interframe calculation is attenuated to ½ by coefficient circuit 31, and the signal is supplied to interpolation filter (IPF) 32, thus compensating for omissions of the signal caused by subsampling, switching action by switch circuit 29, and calculation in adder 30. The compensated output is supplied to output terminal 33 as the Y/C-separated C signal, and is also supplied to adder 35.

Adder 35 subtracts the interpolated output from IPF 32 from the output selected by switch circuit 29, which is supplied through delay circuit 34, thus obtaining a Y signal. The difference output is supplied to output terminal 36 as a Y/C-separated Y signal.

Delay circuit 34 is inserted to synchronize the output from IPF 32 with the output from switch circuit 29 along the time base.

The circuit operation of the above arrangement will be described below with reference to FIGS. 5A to 6E.

FIGS. 5A to 5G show signals S1 to S7 at the respective portions of FIG. 4, and FIGS. 6A to 6E show corresponding signal spectra.

Figure 5A:
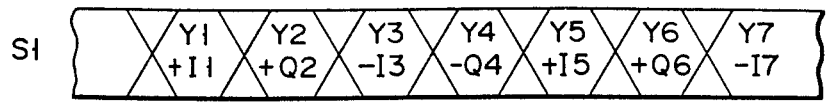
FIGS. 5A to 5G are waveform charts of signals generated at respective portions of the circuit shown in FIG. 4.
Figure 5B:
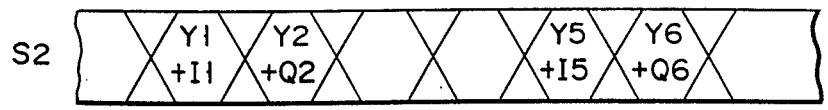
Figure 6A:
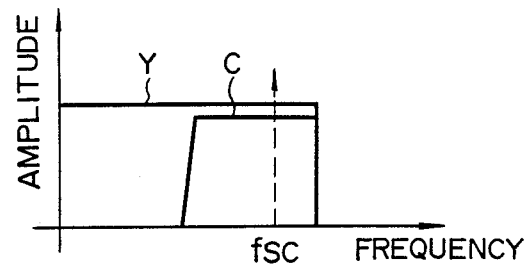
FIGS. 6A to 6E are graphs showing frequency spectra of the signals generated at the respective portions of the circuit shown in FIG. 4.

Composite television signal Sl in FIG. 4 is obtained by alternately multiplexing I and Q signals at ¼fsc intervals, as shown in FIG. 5A. Signal Sl has a signal spectrum in which a C signal is frequency-multiplexed on a high frequency range of a Y signal, as shown in FIG. 6A. When composite television signal Sl is subsampled by switch circuit 26, the composite television signal including negative I and Q signal components is omitted, and composite television signal S2 including only positive I and Q signal components can be obtained, as shown in FIG. 5B.

Figure 5C:
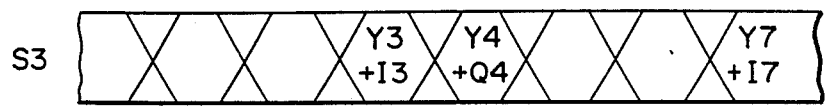

Therefore, the data volume of the composite television signal is halved and input to frame memory 28 by the selection operation of switch 26. Since the phase of the C signal is inverted in adjacent frames, composite television signal S3, the sampling phase of which is deviated from that of composite television signal S2 by ½fsc period, is obtained from frame memory 28, as shown in FIG. 5C.

Figure 5D:
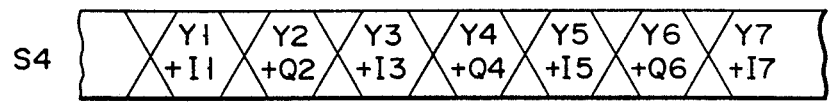
Figure 6B:
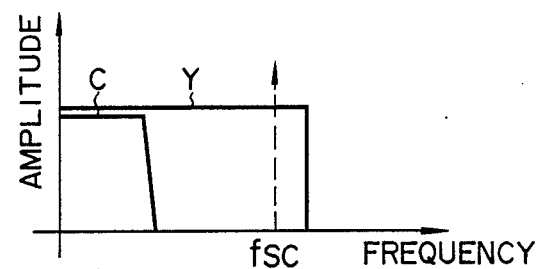

In a conventional apparatus, composite television signal S3 is used as a one-frame delayed output for the interframe calculation. However, in this embodiment, composite television signal S3 includes omissions due to subsampling by switch circuit 26. Composite television signals S2 and S3 are alternately selected by switch circuit 29, so that the omissions of composite television signal S3 can be compensated by composite television signal S2. FIG. 5D shows composite television signal S4 obtained by the interpolation. Composite television signal S4 is obtained by interpolating the omissions of composite television signal S4 by composite television signal S2 including a C signal component having a phase opposite to a C signal component included in composite television signal S3. Therefore, the phase of the C signal component is positive. Thus, composite television signal S4 has a spectrum in which the C signal component is shifted toward a low-frequency range, as shown in FIG. 6B. This means that the C signal is demodulated.

Figure 5E:
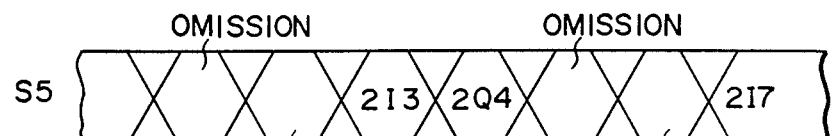
Figure 5F:
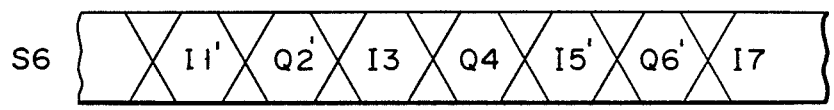
Figure 6C:
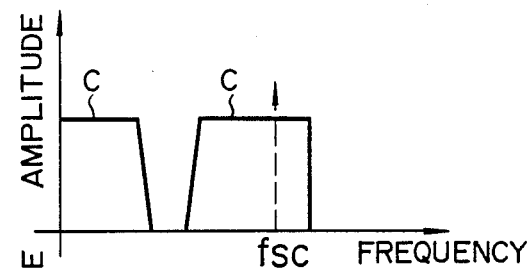
Figure 6D:
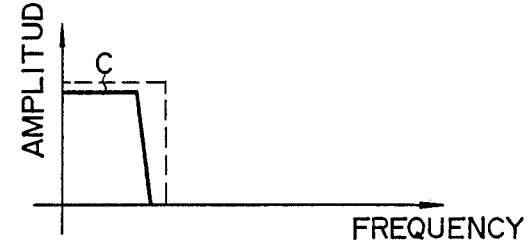

In adder 30, when composite television signal S1 supplied through delay circuit 134 is mixed with or subtracted from composite television signal S4 obtained in this manner, C signal S5 shown in FIG. 5E can be obtained. Since C signal S5 is separated by subtracting composite television signal S1 shown in FIG. 5A from composite television signal S4 having the spectrum shown in FIG. 6B, the spectrum of C signal S5 includes C signal components not only in a low-frequency range but also in a high-frequency range, as shown in FIG. 6C. C signal S5 has an amplitude twice that of an original C signal, and suffers from omissions of signal components due to subsampling, switching action by switch circuit 29, and calculation in adder 30. C signal S5 is supplied to coefficient circuit 31, so that its amplitude is attenuated to ½. C signal S5 is also supplied to IPF 32 to compensate for the omissions of the signal components. Thus, C signal S6 which has an original amplitude and in which the omissions of the signal components are compensated, can be obtained from IPF 32, as shown in FIG. 5F. FIG. 6D shows the spectrum of C signal S6. In C signal S6, not only omissions are compensated for the time area by interpolation processing (to be described in detail later) but also its high-frequency component is removed for the frequency area in accordance with frequency characteristics indicated by a broken line in FIG. 6D. Therefore, a spectrum in which a high-frequency C signal component is removed can be obtained.

Figure 5G:
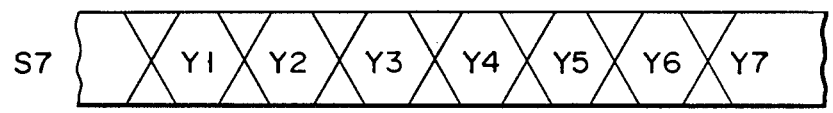
Figure 6E:
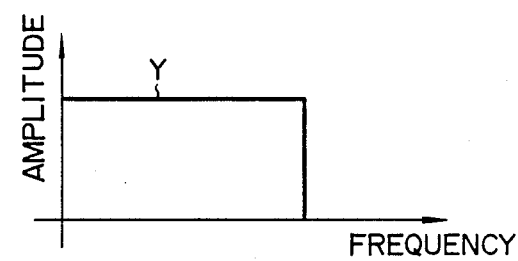

C signal S6 obtained in this manner is mixed with or subtracted from composite television signal S4 shown in FIG. 5D by adder 35, thereby separating Y signal S7, as shown in FIG. 5G. FIG. 6E shows the spectrum of Y signal S7.

The general arrangement and operation of the embodiment has been described. Interpolation processing by IPF 32 will be described below with reference to FIG. 8.

Figure 8:
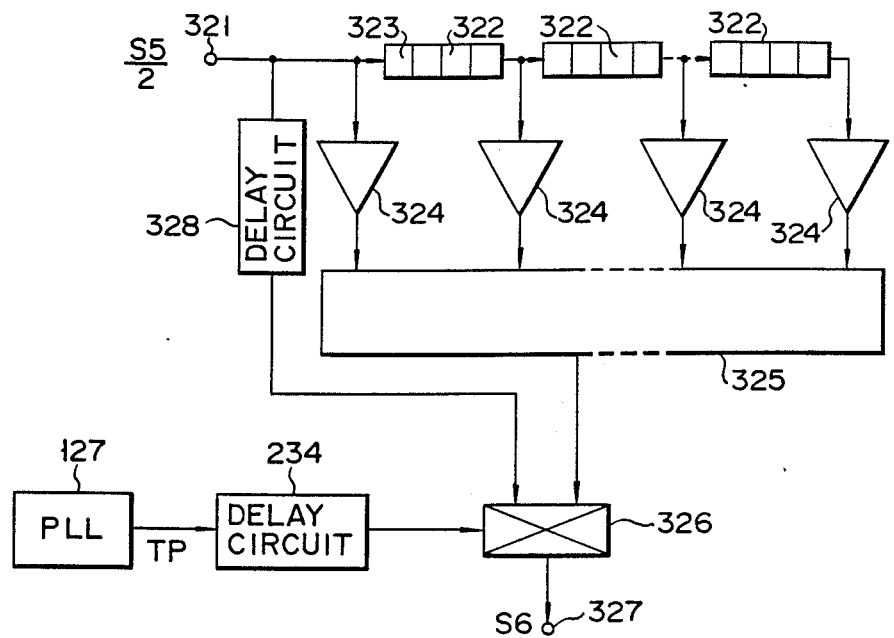
FIG. 8 is a circuit diagram showing in detail IPF shown in FIG. 4.

In FIG. 8, reference numeral 321 denotes an input terminal to which the C signal output from coefficient circuit 31 shown in FIG. 4 is supplied. Input terminal 321 is connected to a series circuit of a plurality of delay circuits 322. Each delay circuit 322 is constituted by series-connecting four delay elements 323 each having a delay amount of 1/4 fsc. Each delay circuit 322 has a delay amount of fsc. The amplitudes of input and output signals of each delay circuit 322 are adjusted by corresponding coefficient circuit 324, and the input and output signals are supplied to adder 325. Adder 325 adds outputs from coefficient circuits 324, and supplies the sum signal to selector 326. Selector 326 also receives the C signal through delay circuit 328. Selector 326 alternately selects one the two input signals at a predetermined timing, which is determined by timing pulse TP generated by PLL circuit 127 and supplied through delay circuit 234, and supplies the selected input signal to output terminal 327.

Figure 9A:
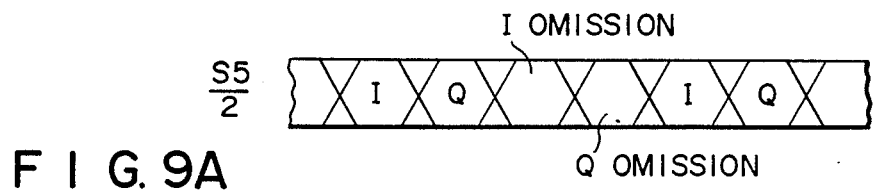
FIGS. 9A and 9B are waveform charts of signals generated at respective portions of the circuit shown in FIG. 8.
Figure 9B:
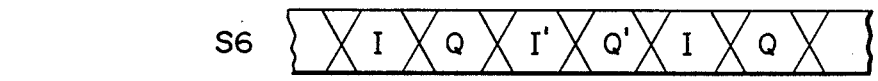

The operation of the circuit shown in FIG. 8 will now be described with reference to FIGS. 9A and 9B. FIG. 9A shows the C signal supplied to input terminal 321, and FIG. 9B shows the C signal supplied to output terminal 327. In FIGS. 9A and 9B, "I omission" indicates an omission of an I signal component, and "Q omission" indicates an omission of a Q signal component. "I'" indicates a signal component interpolating "I omission" and Q' indicates a signal component interpolating "Q omission".

Since the delay amount of each delay circuit 322 is set to be 1/fsc, in other words, since the delay amount of each delay element 323 is set to be ¼fsc, one of I, Q, I omission, and Q omission signal components repetitively appears in this order at ¼fsc intervals at the input and output terminals of each delay circuit 322. Therefore, adder 325 repetitively outputs the sum output of only the I signal components, the sum output of only the Q signal components, the sum output of only the I omission signal components, and the sum output of only the Q omission signal components in this order. The sum output of only the I signal components is called interpolating signal I', and the sum output of only the Q signal components is called interpolating signal Q'.

When adder 325 outputs interpolating signal I' or Q', selector 326 selects the output from adder 325. When the sum output of the I or Q omission signal components is obtained, selector 326 selects the C signal supplied through delay circuit 328 from input terminal 321. Delay circuit 328 serves for delaying the C signal by ½fsc period. As described above, the selection timing of selector 326 is given by timing pulse TP generated by PLL circuit and supplied through delay circuit 234.

In this manner, the IPF shown in FIG. 8 obtains interpolating signal I' for I-omission from only the I signal components, and obtains interpolating signal Q' for Q-omission from only the Q signal components. A plurality of delay circuits 322 are arranged, and both interpolating signals I' and Q' are obtained from four or more sampled I and Q signal components. Therefore, interpolating signals I' and Q' can be obtained by an ideal IPF.

In IPF 32 shown in FIG. 8, the coefficient value of coefficient circuit 324 is appropriately selected to obtain frequency characteristics indicated by a broken line in FIG. 6D.

As described above, according to this embodiment, the composite television signal is subsampled and is supplied to frame memory 28 to be stored therein for a one-frame period. Omissions of signal components due to the subsampling are interpolated by the subsampling output. The interpolated signal is subjected to an interframe calculation with the composite television signal. In a C signal extracted by the interframe calculation, the omissions of signal components due to the subsampling and subsequent calculation are compensated by adjacent signal components.

With this arrangement, frame memory 28 needs to store only composite television signal S2 whose data volume is halved by subsampling. Therefore, the capacity of frame memory 28 can be reduced to half of the conventional memory. As a result, the circuit scale can be greatly reduced as compared to a conventional circuit.

In this embodiment, omissions of signal components due to subsampling are compensated by interpolation processing by switch circuit 29 and by IPF 32. Although the data volume is reduced by subsampling, a Y/C separation performance almost equivalent to the conventional one can be obtained.

In this embodiment, in a delayed output from frame memory 28, since omissions of signal components by subsampling are interpolated by the subsampling output, a C signal can be demodulated without using a sync detector.

The conventional circuit shown in FIG. 2 requires two filters, i.e., BPF 15 and LPF 17, while the circuit of this embodiment requires only IPF 32. Therefore, upon fabrication of an IC, its circuit scale and the number of parts to be externally mounted can be reduced.

The present invention can also be applied to Y/C separation of modified NTSC composite television signals. That is, the present invention can be applied to Y/C separation of composite television signals in which a C signal component is frequency-multiplexed on a part of a frequency range of a Y signal component, and the C signal is inverted for every frame.

Various other changes and modifications may be made within the spirit and scope of the invention.

What is claimed is:

1. A signal separator comprising:

an A/D converter for sampling an NTSC composite video signal including a luminance signal component and a color difference signal component at a sampling frequency four times a frequency of a chrominance subcarrier and outputting a digital signal;

timing signal generating means for receiving the digital signal output from said A/D converter and generating at least first and second timing signals having the frequency of the chrominance subcarrier;

data selecting means for selecting predetermined data of the digital signal output from said A/D converter in accordance with the first timing signal generated by said timing signal generating means and outputting a selected signal;

a delay line for delaying the selected signal output from said data selecting means by one frame and outputting a delayed signal;

first interpolation means for interpolating the delayed signal output from said delay line by the selected signal output from said data selecting means in accordance with the second timing signal generated by said timing signal generating means and outputting a first interpolated signal;

first separation means for separating the color difference signal component from the NTSC composite video signal by mixing the first interpolated signal output from said first interpolation means and the digital signal output from said A/D converter;

second interpolation means for interpolating the color difference signal component separated by the first separation means by a predetermined operation and outputting a second interpolated signal; and second separation means for separating the luminance signal component by mixing the first interpolated signal output from the first interpolation means and the second interpolated signal output from the second interpolation means.

2. The separator according to claim 1, wherein said timing signal generating means includes a PLL circuit.

3. A separator according to claim 1, wherein said timing signal generating means has a means for generating a third timing signal which is supplied to said delay line.

4. A separator according to claim 1, further comprising delay means, arranged between said A/D converter and said first separation means, for delaying the digital signal output from said A/D converter.

5. A separator according to claim 1, further comprising a coefficient circuit for multiplying ½ with the color difference signal component separated by said first separation means.

6. A separator according to claim 1, further comprising delay means, arranged between said first interpolation means and said second separation means, for delaying the first interpolated signal output from the first interpolation means.

7. A separator according to claim 1, wherein said data selecting means includes a switch circuit.

8. A separator according to claim 1, wherein said second interpolation means comprises an interpolation filter.

9. A separator according to claim 8, wherein said interpolation filter includes a plurality of delay circuits, each of which has a delay amount of:

$$\frac{1}{\text{frequency of the chrominance subcarrier}}$$

* * * * *